US008399532B2

(12) United States Patent
Mulkey

(10) Patent No.: US 8,399,532 B2
(45) Date of Patent: Mar. 19, 2013

(54) POLYOL COMPOSITIONS, RESIN BLEND COMPOSITIONS, SPRAY COMPOSITIONS, AND METHODS OF USING EACH, AND METHODS OF MAKING EACH

(75) Inventor: David K. Mulkey, Wilmington, NC (US)

(73) Assignee: Invista North America S.A R.L., Wilmington, DE (US)

( * ) Notice: Subject to any disclaimer, the term of this patent is extended or adjusted under 35 U.S.C. 154(b) by 248 days.

(21) Appl. No.: 12/781,849

(22) Filed: May 18, 2010

(65) Prior Publication Data

US 2010/0298459 A1 Nov. 25, 2010

Related U.S. Application Data

(60) Provisional application No. 61/179,528, filed on May 19, 2009.

(51) Int. Cl.
*C08G 18/28* (2006.01)
(52) U.S. Cl. .......... 521/173; 521/99; 521/111; 521/123; 521/128
(58) Field of Classification Search .................. 521/99, 521/111, 123, 128, 173
See application file for complete search history.

(56) References Cited

U.S. PATENT DOCUMENTS

| | | | |
|---|---|---|---|
| 3,356,621 A | 12/1967 | Hopkins, Jr. et al. | |
| 3,399,154 A | 8/1968 | Bernstein et al. | |
| 3,827,993 A | 8/1974 | Cunningham et al. | |
| 3,933,698 A | 1/1976 | Fuzesi et al. | |
| 4,071,482 A | 1/1978 | Hopkins, Jr. et al. | |
| 4,608,432 A | 8/1986 | Magnus et al. | |
| 4,609,513 A | 9/1986 | Israel | |
| 4,644,027 A | 2/1987 | Magnus et al. | |
| 4,644,047 A | 2/1987 | Wood | |
| 4,644,048 A | 2/1987 | Magnus et al. | |
| 4,722,803 A | 2/1988 | Magnus et al. | |
| 4,758,602 A | 7/1988 | Trowell | |
| 4,812,533 A | 3/1989 | Simone et al. | |
| 4,897,429 A | 1/1990 | Trowell et al. | |
| 5,075,417 A | 12/1991 | Trowell et al. | |
| 5,252,615 A | 10/1993 | Rao et al. | |
| 5,877,255 A | 3/1999 | Gerber et al. | |
| 5,922,779 A | 7/1999 | Hickey | |
| 6,133,329 A | 10/2000 | Shieh et al. | |
| 6,211,257 B1 | 4/2001 | Kaplan et al. | |
| 6,258,869 B1 | 7/2001 | Shah et al. | |
| 6,359,022 B1 | 3/2002 | Hickey et al. | |
| 6,420,493 B1 | 7/2002 | Ryckis-Kite et al. | |
| 6,664,363 B1 | 12/2003 | Faunce | |
| 6,884,824 B2 | 4/2005 | Bleys et al. | |
| 7,560,526 B2 | 7/2009 | Shieh | |
| 2004/0059011 A1* | 3/2004 | Barber et al. | 521/99 |
| 2005/0032925 A1* | 2/2005 | Kaplan | 521/155 |
| 2006/0047011 A1 | 3/2006 | Kusan-Bindels et al. | |
| 2006/0235100 A1 | 10/2006 | Kaushiva et al. | |
| 2007/0208096 A1 | 9/2007 | DeLeon et al. | |
| 2007/0238798 A1 | 10/2007 | McDaniel et al. | |
| 2007/0249751 A1 | 10/2007 | Wang et al. | |
| 2008/0114086 A1 | 5/2008 | Lorenz et al. | |
| 2008/0161441 A1 | 7/2008 | Wang et al. | |
| 2009/0023823 A1 | 1/2009 | Kim et al. | |
| 2009/0082483 A1 | 3/2009 | Petrovic et al. | |
| 2009/0306237 A1 | 12/2009 | Babb et al. | |
| 2010/0048754 A1 | 2/2010 | Abraham | |

FOREIGN PATENT DOCUMENTS

| | | |
|---|---|---|
| CN | 1487001 A | 4/2004 |
| CN | 101270203 | 9/2008 |
| DE | 122986 A1 | 11/1976 |
| DE | 19639334 A1 | 4/1998 |
| GB | 1056646 A | 1/1967 |
| GB | 1513915 A | 6/1978 |
| JP | 10330470 A | 12/1998 |
| JP | 11292960 A | 10/1999 |
| JP | 03201329 A | 7/2003 |
| JP | 03301023 A | 10/2003 |
| JP | 2006335810 | 12/2006 |
| KR | 849123 B1 | 7/2008 |
| NL | 6713481 | 4/1969 |
| PL | 189376 B1 | 10/1999 |
| WO | 9531493 A1 | 11/1995 |
| WO | 9942508 A1 | 8/1999 |
| WO | 0058383 A1 | 10/2000 |
| WO | 0061654 A1 | 10/2000 |
| WO | 03042272 A1 | 5/2003 |
| WO | 2004060948 A2 | 7/2004 |
| WO | 2004083274 A1 | 9/2004 |
| WO | 2005085310 A2 | 9/2005 |
| WO | 2007085548 A1 | 8/2007 |
| WO | 2007094780 A1 | 8/2007 |
| WO | 2007120148 A1 | 10/2007 |
| WO | 2008139841 A1 | 11/2008 |
| WO | 2009045926 A1 | 4/2009 |

OTHER PUBLICATIONS

List of ASTM Methods, from ASTM International, West Conshohocken, Pennsylvania, USA, www.astm.org.
Dowling, K.C., Feske, E.F., Using the Cone Calorimeter to Predict the Fire Performance of Rigid Polyurethane Foams in the Steiner Tunnel, and Comparison with European Standard Tests; 35th Annual Polyurethane Technical/Marketing Conference; Oct. 1994, pp. 357-363.
The Polyurethanes Book, by Huntsman. NOT attached, but the following citation info provided: The Polyurethanes Book, Ed. David Randall and Steve Lee, Wiley (2003). ISBN-13: 978-0-470-85041-1; ISBN-10: 0470850418; Copyright © 2002 Huntsman International LLC, Polyurethanes business. Originally published in 1987. Reprinted with updates in 1990. http://www.wiley.com/WileyCDA/WileyTitle/productCd-0470850418,descCd-description.html.
"The Polyurethanes Book" by Huntsman [The Polyurethanes Book, Ed. David Randall and Steve Lee, Wiley (2003), IBSN 0-470-85041-8] (Book—furnished upon request).
Grimminger, et al., Silicone Surfactants for Pentane Blown Rigid Form, Polyurethanes World Congress 1993, Oct. 10-13, 1993, Norderstedt, Germany, pp. 609-618.

(Continued)

*Primary Examiner* — John Cooney
(74) *Attorney, Agent, or Firm* — Robert B. Furr, Jr.

(57) ABSTRACT

Embodiments of the disclosure include aromatic polyol compositions, resin blend compositions, and spray foam compositions.

10 Claims, No Drawings

OTHER PUBLICATIONS

Murphy, A Comparison of HFC and HC Foam Blowing Agents—Properties and Economics, Ployurethanes Expo 1996, Elf Atochem NA, pp. 411-414.

Nicola, et al., Improved Hydrocarbon Blown Foams for North America, Polyurethane 1995, Sep. 26-29, 1995, pp. 156-162.

Ozkadi, et al., Mechanical and Thermal Properties of Rigid Polyurethane Foam Blown with C-Pentane, Polyurethanes Expo 1996, Istanbul, Turkey, pp. 53-56.

Peterson, Parameters Affecting the Compatibility of Alternative Blowing Agents in Polyols for Rigid Foam Formulations, Polyurethanes Expo 1996, Pittsburgh, PA, pp. 422-427.

Singh, et al., The Effect of Blowing Agent Solubility on the Long Term Dimensional Stability of Rigid Polyurethane Foams, Polyurethanes Expo 1996, West Deptford, NJ and Kartenberg, Belgium, pp. 415-421.

Stewart, et al., The Development of a Class I* ASTM E-84 CO2 Blown Pour-in-Place System, Polyurethane 1995, Sep. 26-29, 1995, West Deptford, NJ, pp. 163-169.

Wacker et al., Evolution of Hydrocarbon Blown Formulations for Domestic Appliances Application, Polyurethanes Expo 1996, Giengen, Germany and Ternate, Italy, pp. 18-22.

* cited by examiner

POLYOL COMPOSITIONS, RESIN BLEND COMPOSITIONS, SPRAY COMPOSITIONS, AND METHODS OF USING EACH, AND METHODS OF MAKING EACH

CROSS-REFERENCE TO RELATED APPLICATIONS

This application claims the benefit of the filing date of U.S. Provisional Application No. 61/179,528 filed on May 19, 2009, the entire contents of which are incorporated herein by reference.

BACKGROUND OF THE INVENTION

Sprayed polyurethane (PU) foams have historically used "aromatic polyester polyol" (herein referred to as APP) as a way to improve physical strength and flammability performance. Cost advantages by incorporating APPs are also realized due to a decrease in more expensive raw material usage such as flame retardants and other petroleum based polyols.

With the blowing agent change to primarily HFC-245fa (1,1,1,3,3-pentafluoropropane) for sprayed PU insulation foams, the total amount of APPs in a given "B" side formulation has decreased. Solubility of HFC-245fa in APP's is low and leading to a decrease in APP usage. As HFC-245fa is expensive, water is used as a co-blowing agent to reduce cost. Higher water usage in combination with APPs leads to issues of surface friability in colder application temperatures (<50° F.). Formulators must now replace the APPs with other types of polyols and additives to overcome the obstacles of surface friability and blowing agent solubility.

There exists a significant interest in bio-based spray foams raised by United States Government initiatives which stress the importance of using products with bio-content for all building materials where applicable. In the United States, the Code of Federal Regulations (CFR Title 7 Part 2902) details guidelines for designating bio-based products for federal procurement. In this guideline, the preferred procurement product must have a bio-based content, as measured by ASTM D6866, of at least 7 percent, based on the amount of qualifying bio-based carbon in the product as a percent of the weight (mass) of the total organic carbon in the finished product. The guideline is specifically for spray-in-place plastic foam products designed to provide a sealed thermal barrier for residential or commercial construction applications.

SUMMARY OF THE INVENTION

Embodiments of the disclosure include aromatic polyol compositions, resin blend compositions, and spray foam compositions. An embodiment of the aromatic polyol composition, among others, includes: reaction products of: a first composition comprising a hydroxylated material; a second composition selected from the group consisting of: an acid, an ester, an anhydride, and a mixture thereof; and a third composition comprising a material selected from the group consisting of: a hydrophobic material, a hydrophilic material, and a combination thereof.

An embodiment of the resin blend, among others, includes: an aromatic polyol composition as described above and herein; a surfactant, a catalyst, and a blowing agent.

An embodiment of the spray foam composition, among others, includes: a reaction product of the resin blend composition as described above and herein with a polyfunctional isocyanate.

An embodiment of the aromatic polyol composition, among others, includes: a reaction product of a first composition comprising one or more of glycerine, diethylene glycol, and a combination thereof; a second composition comprising one or more of dimethyl terephalate, phthalic anhydride, and a combination thereof; and a third composition comprising one or more of the following: palmitic acid, castor oil, tall oil fatty acid, soybean oil, and a combination thereof.

An embodiment of the resin blend composition, among others, includes: the aromatic polyol composition; a surfactant, a catalyst, and a blowing agent, where the aromatic polyol composition is a reaction product of a first composition comprising one or more of glycerine, diethylene glycol, and a combination thereof; a second composition comprising one or more of dimethyl terephalate, phthalic anhydride, and a combination thereof; and a third composition comprising one or more of the following: palmitic acid, castor oil, tall oil fatty acid, soybean oil, and a combination thereof.

An embodiment of the spray foam composition, among others, includes: a reaction product of the resin blend composition of any one of the resin blend compositions with a polyfunctional isocyanate, wherein the composition has an NCO index of about 120 to 250 at a volume ratio of A:B of about 1:1 to 3:1, wherein A is an A side component including polyisocyanate, and wherein B is a B side component including the aromatic polyol composition, wherein the spray foam composition has a bio-based content of 7% by weight or greater as measured by ASTM D6866, where the resin blend compositions includes an aromatic polyol composition that is a reaction product of a first composition comprising one or more of glycerine, diethylene glycol, and a combination thereof; a second composition comprising one or more of dimethyl terephalate, phthalic anhydride, and a combination thereof; and a third composition comprising one or more of the following: palmitic acid, castor oil, tall oil fatty acid, soybean oil, and a combination thereof.

An embodiment of the aromatic polyol composition, among others, includes: reaction products of: a first composition consisting essentially of a hydroxylated material; a second composition selected from the group consisting of: an acid, an ester, an anhydride, and a mixture thereof; and a third composition comprising a material selected from the group consisting of: a hydrophobic material, a hydrophilic material, and a combination thereof.

An embodiment of the resin blend, among others, consisting essentially of: an aromatic polyol composition as described above and herein; a surfactant, a catalyst, and a blowing agent.

An embodiment of the spray foam composition, consisting essentially of, includes: a reaction product of the resin blend composition as described above and herein with a polyfunctional isocyanate.

An embodiment of the aromatic polyol composition, among others, includes: reaction products of: a first composition consisting of a hydroxylated material; a second composition selected from the group consisting of: an acid, an ester, an anhydride, and a mixture thereof; and a third composition comprising a material selected from the group consisting of: a hydrophobic material, a hydrophilic material, and a combination thereof.

An embodiment of the resin blend, among others, consisting of: an aromatic polyol composition as described above and herein; a surfactant, a catalyst, and a blowing agent.

An embodiment of the spray foam composition, among others, consisting of: a reaction product of the resin blend composition as described above and herein with a polyfunctional isocyanate.

An embodiment of the aromatic polyol composition, among others, includes: reaction products of: a first composition consisting essentially of one or more of glycerine, diethylene glycol, and a combination thereof; a second composition consisting essentially of one or more of dimethyl terephalate, phthalic anhydride, and a combination thereof; and a third composition consisting essentially of one or more of the following: palmitic acid, castor oil, tall oil fatty acid, soybean oil, and a combination thereof.

An embodiment of the aromatic polyol composition, among others, includes: reaction products of: a first composition consisting of one or more of glycerine, diethylene glycol, and a combination thereof; a second composition consisting of one or more of dimethyl terephalate, phthalic anhydride, and a combination thereof; and a third composition consisting of one or more of the following: palmitic acid, castor oil, tall oil fatty acid, soybean oil, and a combination thereof.

DESCRIPTION OF THE INVENTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the suitable methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, polymer chemistry, foam chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 20° C. and 1 atmosphere absolute.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

As used in this specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

As used herein, the following terms have the meanings ascribed to them unless specified otherwise. In this disclosure, "comprises," "comprising," "containing" and "having" and the like can have the meaning ascribed to them in U.S. Patent law and can mean "includes," "including," and the like; "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited (e.g., trace contaminants, components not reactive with the polymer or components reacted to form the polymer, and the like) so long as basic or novel characteristics of that which is recited is not changed by the presence of more than that which is recited, but excludes prior art embodiments.

DEFINITIONS

The term "spray foam" is used to refer to plastics with a cell structure produced by an expansion process, known as "foaming", and also having a comparatively low weight per unit volume and with low thermal conductivity. Optionally, the foaming process can be carried out substantially simultaneously with the production of the plastic. Rigid foams are often used as insulators for noise abatement and/or as heat insulators in construction, in cooling and heating technology (e.g., household appliances), for producing composite materials (e.g., sandwich elements for roofing and siding), and for wood simulation material, model-making material, and packaging.

The term "hydroxyl value" refers to the concentration of hydroxyl groups, per unit weight of the polyol composition, that are able to react with the isocyanate groups. The hydroxyl number is reported as mg KOH/g, and is measured according to the standard ASTM D 1638 (as of 2009).

The term "acid number" correspondingly indicates the concentration of carboxylic acid groups present in the polyol, and is reported in terms of mg KOH/g and measured according to standard ASTM 4662-98 (as of 2009).

The term "average functionality", or "average hydroxyl functionality" of a polyol indicates the number of OH groups per molecule, on average. The average functionality of an isocyanate refers to the number of —NCO groups per molecule, on average.

The term "aliphatic group" refers to a saturated or unsaturated linear or branched hydrocarbon group and encompasses alkyl, alkenyl, and alkynyl groups, for example.

The terms "alk" or "alkyl" refer to straight or branched chain hydrocarbon groups having 1 to 12 carbon atoms, for example 1 to 8 carbon atoms, such as methyl, ethyl, n-propyl, i-propyl, n-butyl, i-butyl, t-butyl, pentyl, hexyl, heptyl, n-octyl, dodecyl, octadecyl, amyl, 2-ethylhexyl, and the like. An alkyl group is optionally substituted, unless stated otherwise, with one or more groups, selected from aryl (optionally substituted), heterocyclo (optionally substituted), carbocyclo (optionally substituted), halo, hydroxy, protected hydroxy, alkoxy (e.g., $C_1$ to $C_7$) (optionally substituted), acyl (e.g., $C_1$ to $C_7$), aryloxy (e.g., $C_1$ to $C_7$) (optionally substituted), alkylester (optionally substituted), arylester (optionally substituted), alkanoyl (optionally substituted), aroyl (optionally substituted), carboxy, protected carboxy, cyano, nitro, amino, substituted amino, (monosubstituted)amino, (disubstituted) amino, protected amino, amido, lactam, urea, urethane, sulfonyl, and the like.

The term "alkenyl" refers to straight or branched chain hydrocarbon groups having 2 to 12 carbon atoms, for example 2 to 4 carbon atoms, and at least one double carbon to carbon bond (either cis or trans), such as ethenyl. An alkenyl group is optionally substituted, unless stated otherwise, with one or more groups, selected from aryl (including substituted aryl), heterocyclo (including substituted heterocyclo), carbocyclo (including substituted carbocyclo), halo, hydroxy, alkoxy (optionally substituted), aryloxy (optionally substituted), alkylester (optionally substituted), arylester (optionally substituted), alkanoyl (optionally substituted), aroyl (optionally substituted), cyano, nitro, amino, substituted amino, amido, lactam, urea, urethane, sulfonyl, and the like.

The term "alkynyl" refers to straight or branched chain hydrocarbon groups having 2 to 12 carbon atoms, for example 2 to 4 carbon atoms, and at least one triple carbon to carbon bond, such as ethynyl. An alkynyl group is optionally substituted, unless stated otherwise, with one or more groups, selected from aryl (including substituted aryl), heterocyclo (including substituted heterocyclo), carbocyclo (including substituted carbocyclo), halo, hydroxy, alkoxy (optionally substituted), aryloxy (optionally substituted), alkylester (optionally substituted), arylester (optionally substituted), alkanoyl (optionally substituted), aroyl (optionally substituted), cyano, nitro, amino, substituted amino, amido, lactam, urea, urethane, sulfonyl, and the like.

The term "reaction product" correspondingly indicates a product resulting from the transformation of at least a first and a second chemical species (e.g., a first composition, a second composition, and a third composition) into a third and different chemical species. Herein, the "reaction product" is a polyol characterized by an "average hydroxyl functionality" and an "acid number." The first chemical species is more generally characterized by a fixed number of hydroxyl function groups. While the second chemical species is more generally characterized by a fixed number of carboxylic acid groups. The reaction product more generally has an excess of hydroxyl function groups and generally at least one ester linkage formed during the reaction of the first and second chemical species.

Pressures reported as pounds per square inch gauge (psig) are relative to one atmosphere. 1 pound per square inch=6.895 kilopascal. One atmosphere is equivalent to 101.325 kilopascals, and one atmosphere is about 14.7 pounds per square inch absolute (psia) or about 0 pounds per square inch gauge (psig).

Discussion:

Embodiments of the present disclosure include polyol compositions, methods of making polyol compositions, methods of using polyol compositions, resin blend compositions, methods of making resin blend compositions, methods of using resin compositions, spray foam compositions, methods of making spray foam compositions, methods of using spray foam compositions, polyurethane (PU) and/or polyisocyanurate (PIR) spray foams, methods of making polyurethane (PU) and/or polyisocyanurate (PIR) spray foams, methods of using polyurethane (PU) and/or polyisocyanurate (PIR) spray foams, and the like.

In addition, embodiments of the present disclosure can include bio-based versions of each of the embodiments described herein. In an embodiment, a bio-based foam formed from the bio-based polyol composition, for example, includes a bio-based content of 7% of the weight (mass) of the total organic carbon in the finished product or greater as measured by ASTM D6866. The biobased content of a material measured using ASTM D 6866 is sometimes expressed in this disclosure as % Biobased Value (BV).

Embodiments of the polyol composition can be used to make resins, foams, elastomers, coatings, and the like. Embodiments of the polyol composition include an aromatic polyol (e.g., aromatic polyester polyol (APP)) formed from the reaction products of a first composition, a second composition, and a third composition. In an embodiment, the first composition includes a hydroxylated material. In an embodiment, the second composition can include one or more of the following: an acid, an ester, and an anhydride. In an embodiment, the third composition includes a material selected from the following: a hydrophobic material, a hydrophilic material, and a combination thereof. In an embodiment, each of the first composition, second composition, and/or the third composition, may independently only include on a single primary compound.

The third composition can be the component that can include the bio-based component. In this regard, inclusion of the third composition can be used to produce a bio-based polyol composition, a bio-based spray foam, a bio-based resin blend composition, or a bio-based product derived from any of these. In particular, the third composition can be included in an appropriate amount so that the end product has an appropriate bio-based content (e.g., a bio-based content of greater than 7% by weight for a foam product). In an embodiment the third composition can be about 10 to 70% by weight of the polyol composition or about 15 to 30% by weight of the polyol composition. In an embodiment the third composition can be present in an amount so that the polyol composition has a bio-based content of about 10 to 70% by weight of the polyol composition or about 15 to 30% by weight of the polyol composition.

In an embodiment, the bio-based component (e.g., the third component) can be covalently bonded to the backbone of the polyol. In an embodiment, the polyol can be an aromatic polyester polyol having aromatic ester linkages. The bio-based component (e.g., a natural oil) can be bonded via the ester linkage to the polyol backbone, for example.

In an embodiment, the third composition includes hydrophobic materials selected from the group of natural oils, their corresponding fatty acids, their corresponding fatty acid esters, and mixtures thereof. In particular, the hydrophobic material includes one or more of the following: tallow oil, tall oil fatty acid, soybean oil, coconut oil, castor oil, linseed oil, nonedibile plant derived oils, animal derived oils, and edible plant derived oils.

In an embodiment, the third composition includes hydrophilic materials selected from the group of polyethylene glycols (PEGs). In an embodiment, the PEGs can have a molecular weight of about 200 to 2000 or about 200 to 1000.

In an embodiment, the third composition includes one or more hydrophobic materials and one or more hydrophilic materials. In an embodiment, the third composition can be less than 50% by weight of the polyol composition. In an embodiment, the third composition can be about 10 to 50% by weight or about 10 to 30% by weight, of the polyol.

In an embodiment, the second composition includes compounds such as terephthalic acid, isophthalic acid, orthophthalic acid, trimellitic acid, monofunctional acids (e.g., stearic acid), orthophthalic anhydride, maleic anhydride, fumaric anhydride, polyethylene terephthalate, trimellitic anhydride, and their corresponding esters (e.g., esters of terephthalic acid, esters of isophthalic acid, and the like), and mixtures thereof. In an embodiment, the second composition can include compounds such as succinic acid, glutaric acid, adipic acid, and esters of each, and mixtures of each. In an embodiment, the second composition can be about 20 to 70% by weight or about 30 to 40% by weight, of the polyol.

In an embodiment, the first composition can be a hydroxylated material having an average functionality of at least 2 or about 2 to 8. In an embodiment, the hydroxylated material can include diethylene glycol, dipropylene glycol, polyethylene glycol, polyether polyols, and a mixture thereof. In an embodiment, the first composition can include a monofunctional hydroxylated material (e.g., aliphatic mono-alcohols, aromatic mono-alcohols, alkyl-substituted aryl mono-alcohols, alkyl-substituted phenols). In an embodiment, the hydroxylated material can include glycerin, trimethylol, methyl glucoside, trimethylol propane, pentaerythritol, sucrose, sorbitol, and a combination thereof. In an embodiment, the monofunctional hydroxylated material can include nonyl phenol. In an embodiment the first composition can be about 20 to 60% by weight or about 40 to 50% by weight, of the polyol.

In an embodiment, the aromatic polyester polyol can be formed from a first composition comprising one or more of glycerine, diethylene glycol, and a combination thereof; a second composition comprising one or more of dimethyl terephalate, phthalic anhydride, and a combination thereof; and a third composition comprising one or more of the following: palmitic acid, castor oil, tall oil fatty acid, soybean oil, and a combination thereof. In an embodiment, the first composition can be about 20 to 60% by weight, about 40 to 50% by weight, or about 40 to 45% by weight, of the aromatic polyol composition. In an embodiment, the second composition can be about 20 to 70% by weight, about 30 to 40% by weight, or about 35 to 40% by weight, of the aromatic polyol composition. In an embodiment, the third composition can be about 10 to 50% by weight, about 10 to 30% by weight, or about 15 to 20% by weight, of the aromatic polyol composition.

In an embodiment, the first composition can be diethylene glycol and the second composition can be dimethyl terephalate. In the same or an additional embodiment, the third composition includes a combination of palmitic acid and castor oil, and where the first composition also includes glycerine. In the same or an additional embodiment, the third composition includes a combination of palmitic acid and castor oil, and where the first composition also includes glycerine. In the same or an additional embodiment, the third composition can be tall oil fatty acid and, optionally, the first composition also includes glycerine, and optionally, the second composition also includes phthalic anhydride. In the same or an additional embodiment, the third composition is soybean oil.

In an embodiment, the polyol composition can also include a reaction product with a hydroxylated crosslinker. The hydroxylated crosslinker can include glycerin, trimethylol, pentaerythritol, sucrose, sorbitol, and a combination thereof. In an embodiment the hydroxylated crosslinker is about is about 1 to 20% by weight or about 2 to 6% by weight, of the polyol.

In an embodiment, the polyol composition can also include a reaction product with an aliphatic acid/ester (e.g., an aliphatic acid or aliphatic ester). The aliphatic acid/ester can include succinic acid, glutaric acid, adipic acid, their corresponding esters (e.g., esters of succinic acid, esters of glutaric acid, and the like), and a mixture thereof. In an embodiment the aliphatic acid/ester is about 20 to 70% by weight or about 30 to 40% by weight, of the polyol.

In an embodiment, the polyol composition can also include a reaction product of a hydroxylated crosslinker with an aliphatic acid/ester. In an embodiment, the hydroxylated crosslinker can include glycerin, trimethylol, pentaerythritol, sucrose, sorbitol, and a combination thereof. In an embodiment the hydroxylated crosslinker can be about 1 to 20% by weight or about 2 to 6% by weight, of the polyol. In an embodiment, the aliphatic acid/ester can include succinic acid, glutaric acid, adipic acid, their corresponding esters (e.g., esters of succinic acid, esters of glutaric acid, and the like), and a mixture thereof. In an embodiment the aliphatic acid/ester can be about 20 to 70% by weight or about 30 to 40% by weight, of the polyol.

The polyol composition is prepared by methods known to those skilled in the art. For example, the first composition, the second composition, the third composition, optionally the hydroxylated crosslinker, and optionally the aliphatic acid/ester, may be reacted at about 235° C. and the byproducts, such as water or alcohol (e.g., methanol) and the like, are removed as overhead vapor, to drive the reaction to completion (e.g., greater than 70% conversion to polyester polyol), until substantially all of the byproduct alcohol and water are removed, as indicated by overhead vapor condensing temperature (e.g., temperature less than the boiling points of all of the alcohol and water byproducts; e.g., temperature less than 50° C.).

As mentioned above, embodiments of the present disclosure include resin blend compositions. In an embodiment, the resin blend composition can include a polyol composition, a surfactant, a catalyst, and a blowing agent. The polyol composition can include any of those described herein. In an embodiment the polyol composition can be present in an amount so that the resin blend composition has a bio-based content of about 5 to 40% by weight of the total organic carbon in the resin blend composition or about 5 to 20% by weight of the total organic carbon in the resin blend composition.

The surfactant includes any surfactant known to the skilled person in the art for the purposes of making a suitable PU and/or PIR spray foam. In an embodiment, the surfactant can include silicone based surfactants, organic based surfactants, and a mixture thereof. In an embodiment, the surfactant is about 0.25 to 3.0% by weight of the resin blend composition.

In an embodiment, the catalyst can include a metal-based catalyst, amine-based catalyst, and a mixture thereof. The metal-based catalyst can include, but is not limited to, organomercury, organolead, organoferric, organotin, organobismuth, organozinc catalysts (e.g., stannous octoate and dibutyltin dilaurate), and a combination thereof. The amine-based catalyst can include, but is not limited to, triethylenediamine, N-methylmorpholine, pentamethyl diethylenetriamine, dimethylcyclohexylamine, tetramethylethylenediamine, 1-methyl-4-dimethylaminoethyl-piperazine, 3-methoxy-N-dimethyl-propylamine, N-ethylmorpholine, diethylethanolamine, N-cocomorpholine, N,N-dimethyl-N', N'-dimethylisopropyl-propylene diamine, N,N-diethyl-3-diethyl aminopropylamine, dimethyl-benzyl amine, and a combination thereof. In an embodiment, the catalyst is about 2 to 10% by weight of the resin blend composition.

In an embodiment, the blowing agents can be a hydrocarbon having 3 to 7 carbon atoms, a hydrofluorocarbon, water, carbon dioxide, and a mixture thereof. The hydrofluorocarbon can include 1,1,1,3,3-pentafluoropropane (HFC-245fa), 1,1,1,2-tetrafluoroethane (HCF-134a), 1,1-dichloro-1-fluoroethane (HCFC 141-B), chlorodifluoromethane (HCFC R-22), 1,1,1,3,3-pentafluorobutane (HFC-365mfc), and a combination thereof. The hydrocarbon can include butane, n-pentane, i-pentane, cyclopentane, hexane, cyclohexane, each of their alkene analogues, and a combination thereof. In an embodiment, the blowing agent is about 5 to 25% by weight or about 8 to 15% by weight, of the resin blend composition.

In an embodiment, the blowing agent can include two or more blowing agents (e.g., blowing agent, co-blowing agent, and the like). For example, the blowing agent can be 1,1,1,3,3-pentafluoropropane and the co-blowing agent can be water, where 1,1,1,3,3-pentafluoropropane can be about 60 to 99% by weight of the blowing agents and water can be about 1 to 40% by weight of the blowing agents.

The resin blend compositions are prepared by methods known by the skilled person. For example, compositions containing the resin blend can be added to a blend tank and mixed under ambient conditions and, if the blend tank is pressure rated the blowing agent may be added last and all the compositions mixed for a period of time until a homogenous mixture is produced.

In an embodiment, the aromatic polyester polyol used in the resin blend can be formed from a first composition comprising one or more of glycerine, diethylene glycol, and a combination thereof; a second composition comprising one or more of dimethyl terephalate, phthalic anhydride, and a combination thereof; and a third composition comprising one or more of the following: palmitic acid, castor oil, tall oil fatty acid, soybean oil, and a combination thereof. In an embodiment, the first composition can be about 20 to 60% by weight, about 40 to 50% by weight, or about 40 to 45% by weight, of the aromatic polyol composition. In an embodiment, the second composition can be about 20 to 70% by weight, about 30 to 40% by weight, or about 35 to 40% by weight, of the aromatic polyol composition. In an embodiment, the third composition can be about 10 to 50% by weight, about 10 to 30% by weight, or about 15 to 20% by weight, of the aromatic polyol composition.

In an embodiment, the first composition can be diethylene glycol and the second composition can be dimethyl terephalate. In the same or an additional embodiment, the third composition includes a combination of palmitic acid and castor oil, and where the first composition also includes glycerine. In the same or an additional embodiment, the third composition includes a combination of palmitic acid and castor oil, and where the first composition also includes glycerine. In the same or an additional embodiment, the third composition can be tall oil fatty acid and, optionally, the first composition also includes glycerine, and optionally, the second composition also includes phthalic anhydride. In the same or an additional embodiment, where the third composition can be soybean oil.

As mentioned above, embodiments of the present disclosure include spray foam compositions that include a reaction product of the resin blend composition with a polyfunctional isocyanate. The resin blend composition can include any of the resin blend compositions described herein. In an embodiment the resin blend composition can be present in an amount so that the foam formed from the spray foam composition has a bio-based content of about 5 to 15% by weight of the foam or about 7 to 9% by weight of the foam.

In an embodiment, the isocyanate can include any isocyanate with an average functionality of at least 2 that can be used to make a suitable polyurethane (PU) and/or polyisocyanurate (PIR) foam.

As noted above, embodiments of the present disclosure include polyurethane (PU) and/or polyisocyanurate (PIR) spray foams. In an embodiment, the PU and/or PIR spray foam can include a polyol composition and a resin blend composition containing a polyol composition, a catalyst, a surfactant, and a blowing agent. The polyol composition can include any of the polyol compositions described herein. In addition, the catalyst, the surfactant, and the blowing agent can be any of the catalyst, the surfactant, and the blowing agent described herein. In an embodiment the polyol composition can be present in an amount so that the foam produced from the PU and/or PIR spray foam has a bio-based content of about 6 to 20% by weight of the total organic carbon in the foam or about 7 to 9% by weight of the total organic carbon in the foam.

In an embodiment the polyol composition can be an aromatic polyester polyol composition. The aromatic polyester polyol composition may or may not include bio-based components. In an embodiment, the foam formed from the PU and/or PIR spray foam has a bio-based content of 7% by weight and greater as measured by ASTM D6866.

As mentioned above, embodiments of the present disclosure relate to the use of an aromatic polyester polyol composition in a polyol blend composition for spray polyurethane/polyisocyanurate foam. Embodiments of this disclosure relate to the manufacturing of polyurethane/polyisocyanurate foam using HFC 245fa and/or hydrocarbon based blowing agents as described above with or without water at a high index. The foam formed has suitable physical and insulation characteristics (e.g., having an R value above 5 and parallel compressive strength greater than 15 psig (205 kPa) at a density less than 3 lb/cubic ft (48 kg/cubic meter)) as well as having low surface friability according to the friability test method described elsewhere herein.

In an embodiment, the resin blend composition containing an aromatic polyester polyol, a catalyst, a surfactant, and blowing agent can be used to produce a polyurethane and/or a polyisocyanurate foam for spray application with an NCO index ranging from about 120 to 250. In an embodiment, the polyol blend composition can have an average functionality of at least about 1.5 and an overall hydroxyl value of at least about 120.

The amount of isocyanate (—NCO) present may be expressed in terms of an "isocyanate reaction index", also called "isocyanate index", "NCO index" or simply "index." Herein and conventionally in the art, an isocyanate reaction index of 100 corresponds to 1.0 isocyanate group (—NCO) per active hydrogen atom. Additional details regarding the NCO index are described in U.S. Pat. No. 6,884,824, which is incorporated herein by reference. Typical Isocyanate Indexes for sprayed PU foam range from about 110 to 120. As stated in "The Polyurethanes Book" by Huntsman [The Polyurethanes Book, Ed. David Randall and Steve Lee, Wiley (2003), ISBN 0-470-85041-8], Isocyanate Index is the measure of the excess isocyanate used relative to the theoretical equivalent amount required. For example, an index of 105 indicates a 5% excess of isocyanate is being used.

In an embodiment, the PU and/or PIR spray foam can be produced at various volume ratios of resin blend composition and polyisocyanate to obtain a certain Isocyanate Index. The ratios are normally referred to as A:B where "A" (or A-side component) is the polyisocyanate and "B" (or B-side component) is the resin blend. In an embodiment, the ratio can be about 1:1 to 3:1.

Embodiments of the present disclosure include the manufacture of bio-based spray foams utilizing high index PUR and/or PIR spray foam technology to form PUR and/or PIR spray foams. High levels of APP (e.g., greater than 40% by weight on the "B" side, for example) can be achieved through modification of the APP backbone. In an embodiment, the choice of bio-based material used to modify the polymer backbone overcomes the issues of surface friability and blowing agent compatibility as well as being from a non-food source. In addition, embodiments of the disclosure allow a higher foam index to be achieved thereby introducing the advantages of PIR technology such as improved strength and improved flammability performance. All of these benefits lead to a spray foam with a smaller carbon footprint yet retaining the desired foam properties necessary for spray-in place applications.

In an embodiment, the spray foam can be made by high pressure impingement mixing of a resin blend composition with a polyisocyanate. The resin blend composition and polyisocyanate are stored in separate drums from each other. Drum pumps can be used to pull the liquids from each drum into the machine pumps which deliver the liquids through heated hoses to a mixing gun attached at the end of the hoses. The two fluids enter into a mixing chamber inside the spray gun at high pressures and are sprayed onto the substrate. The combined chemicals react and expand to form a foamed material.

In an embodiment, the A-side component can be a polyisocyanate A-side component of the formulations disclosed herein incorporate polymeric MDI (PMDI). As those skilled in the art know, Mondur® MR Lite from Bayer Corporation and Rubinate® M from Huntsman Corporation are typically used. However, it is not intended the A-side component be limited to those specifically illustrated herein. For example, the A-side component of the formulations of the present disclosure can be selected from organic polyisocyanates, modified polyisocyanates, isocyanate-based prepolymers, and mixtures thereof. Such choices can also include aliphatic and cycloaliphatic isocyanates, but aromatic and especially multifunctional aromatic isocyanates are particularly useful.

In an embodiment, the B-side component can be a resin blend containing one or more Mannich polyols, one or more polyester polyols, and one or more polyether polyols (as well as polyols of the present disclosure). Additionally, the B-side component can contain catalysts, surfactants, flame retardants, and/or blowing agents. An example of Mannich polyol is Jeffol® R-425X available from Huntsman Corp. An example of polyester polyol is Terate® 4020 from INVISTA S.à r. l. An example of polyether polyol is Voranol™ 360 from Dow Corp.

In an embodiment, the B-side component can be about 30 to 90% by weight aromatic polyester polyol (APP) or about 60 to 80% by weight APP. In an embodiment, the APP hydroxyl number can be about 150 to 400 or about 190 to about 280. The B-side component may contain about 1 to 50% by weight polyether polyol, or less than about 10% by weight polyether polyol, wherein the polyether polyol has an average functionality of at least 2 or 3 or higher. In an embodiment, the polyether polyol hydroxyl number can be about 29 to 800 or about 29 to 240.

In an embodiment, a low density polyurethane foam is obtainable using a blowing agent which may include HFC-245 FA, HCFC 141-B, HCFC R-22, HFC-365mfc, water, and carbon dioxide and any mixtures of the aforementioned compounds. In an embodiment, a known silicone surfactant stabilizer can be used (e.g., Dabco® DC193), typically at a concentration of about 1 to 10% by weight or 1.2% by weight. The catalyst can include known catalysts such as amine-based compounds, metal based carboxylates, and mixtures thereof. The amount of total catalyst can be about 1 to 10% by weight or not exceeding 6% by weight.

In an embodiment, the aromatic polyester polyol used in the resin blend that is used to form a spray foam can be formed from a first composition comprising one or more of glycerine, diethylene glycol, and a combination thereof; a second composition comprising one or more of dimethyl terephalate, phthalic anhydride, and a combination thereof; and a third composition comprising one or more of the following: palmitic acid, castor oil, tall oil fatty acid, soybean oil, and a combination thereof. In an embodiment, the first composition can be about 20 to 60% by weight, about 40 to 50% by weight, or about 40 to 45% by weight, of the aromatic polyol composition. In an embodiment, the second composition can be about 20 to 70% by weight, about 30 to 40% by weight, or about 35 to 40% by weight, of the aromatic polyol composition. In an embodiment, the third composition can be about 10 to 50% by weight, about 10 to 30% by weight, or about 15 to 20% by weight, of the aromatic polyol composition.

In an embodiment, the first composition is diethylene glycol and the second composition can be dimethyl terephalate. In the same or an additional embodiment, the third composition includes a combination of palmitic acid and castor oil, and where the first composition also includes glycerine. In the same or an additional embodiment, the third composition includes a combination of palmitic acid and castor oil, and where the first composition also includes glycerine. In the same or an additional embodiment, the third composition is tall oil fatty acid and, optionally, the first composition also includes glycerine, and optionally, the second composition also includes phthalic anhydride. In the same or an additional embodiment, where the third composition is soybean oil.

Test Methods

Foam properties are measured according to various standard test methods. K-factor is measured according to ASTM C518-04 Standard Test Method for Steady State Thermal Transmission Properties by Means of the Heat Flow Meter Apparatus. Closed cell content is determined as 100% minus open cell content, which is measured according to ASTM D6226-05 Standard Test Method for Open Cell Content of Rigid Cellular Plastics. Humid age dimensional stability is measured according to ASTM D2126-04 Standard Test Method for Response of Rigid Cellular Plastics to Thermal and Humid Aging. Foam density is measured according to ASTM D1622-93 Standard Test Method for Apparent Density of Rigid Cellular Plastics. Compressive strength is measured according to ASTM D1621-94 Standard Test Method for Compressive Properties of Rigid Cellular Plastics. ASTM standard methods are from ASTM International, West Conshohocken, Pa., USA, www.astm.org.

Calorimeter testing procedures are according to the reference: Dowling, K. C., Feske, E. F., Proceedings of the SPI Polyurethane Conference, 1994, pp. 357-363.

Bio-based content is determined according to ASTM Standard D6866-08, "Standard Test Methods for Determining the Biobased Content of Solid, Liquid, and Gaseous Samples Using Radiocarbon Analysis," ASTM International, West Conshohocken, Pa., USA, 2008, DOI: 10.1520/D6866-08, www.astm.org.

Friability Test

As described in U.S. Pat. Nos. 3,933,698 and 4,071,482; the disclosures of each herein incorporated by reference in their entirety, a surface friability test is conducted using the finger test method. Herein, a foam is produced in a single cup by machine mixing both "A-side" and "B-side" parts together. As the chemicals react the foam produced rises above the rim of the cup. The top portion of the foam is called the crown. At different time intervals, a fingernail is rubbed across the crown with slight downward pressure. The surface friability is observed as being High, Moderate or Low. A High rating indicates considerable surface crumbling, a Moderate rating indicates slight surface crumbling and a Low rating indicates no surface crumbling.

EXAMPLES

The following examples are provided to illustrate the present disclosure. The examples are not intended to limit the scope of the present disclosure and should not be so interpreted.

Example 1

A formulation is made by preparing the following "B" side blend: 72.87% by wt. of an APP obtained from INVISTA under the name Terate® 6512 Polyol. 2.53% by wt. of Triethylphosphate obtained from Aceto Corporation. 2.53% by wt. of Fyrol™ PCF obtained from ICL-IP (formerly Supresta). 3.04% by wt. of Saytex® RB-80LS obtained from Albermarle® Corporation. 1.52% by wt. of DABCO® DC 193 obtained from Air Products. 3.04% by wt. of Carpol® GP-700 from Carpenter Company. 8.10% by wt. of Enovate™ 3000 (HFC-245fa) from Honeywell. 1.01% by wt. of DABCO 33-LV®; 0.76% by wt. of Polycat® 46; 2.02% by wt. of DABCO® K-15; 0.76% by wt. of Curithane® 52 all obtained from Air Products. 1.82% by wt. of water. The "B" side blend is mixed with polyisocyanate obtained from Huntsman Corp. under the trade name Rubinate® M at a volume ratio of 1:1. The cream time of the foam is 11 seconds, and the final rise is at 45 seconds. The resulting foam has the following physical properties:

Density=1.98 lb/cubic ft (31.7 kg/cubic meter)
Parallel Compressive Strength=33 psig (329 kPa)
Perpendicular Compressive Strength=18 psig (225 kPa)
Initial K-Factor (Btu-in/ft$^2$-hr-° F.)=0.148%
Closed Cell Content=96%
Humid Age—28 days=+5.12%
Cone Calorimeter Results (predictor for ASTM E-84 Burn Properties):
Predicted Flame Spread—37 using the predictive test
Smoke Development—Pass (<450)
Cone Calorimeter results strongly predict passing values for Class II rating and predict near-passing values for Class I rating according to ASTM E84-10 Standard Test Method for Surface Burning Characteristics of Building Materials.

Example 2

The following example compares the performance of the embodiments of the present disclosure (e.g., APP) versus a typical APP at a high index. The formulation for the "B" side blend is: 77.23% by wt. of an APP obtained from INVISTA under the name Terate® 6512 Polyol (present disclosure) and Terate® 2031 Polyol. 6.93% by wt. of Fyrol™ PCF obtained from ICL-IP (formerly Supresta). 1.20% by wt. of DABCO® DC 193; 0.99% by wt. of DABCO 33-LV®; 1.98% by wt. of DABCO® K-15; obtained from Air Products. 9.90% by wt. of Enovate™ 3000 (HFC-245fa) from Honeywell. 1.78% by wt. of water. The "B" side blend is mixed with polyisocyanate obtained from Huntsman Corp. under the trade name Rubinate® M to obtain an index of 171-172 for each foam. The following Table 1 is illustrative of friability test results.

TABLE 1

| Time foam | Terate ® 6512 based foam | Terate ® 2031 based foam |
|---|---|---|
| 10 min. | Low Friability | High Friability |
| 1 hour | Low Friability | High Friability |
| 4 hours | Low Friability | High Friability |
| 7 hours | Low Friability | Moderate Friability |
| 22 hours | Low Friability | Moderate Friabiliity |

From the results, one skilled in the art can see the impact of the present disclosure on surface friability and how the results might translate to better adhesion of the spray foam to various substrates Example 3

A spray foam formulation is made by preparing the following "B" side blend: 76.40% by wt. of an APP obtained from INVISTA under the name Terate® 6512 Polyol. 5.00% by wt. of Saytex® RB-79 obtained from Albermarle® Corporation. 1.00% by wt. of DABCO® DC 193; 3.00% by wt. Polycat® 30 obtained from Air Products. 2.00% by wt. of Pluracol® 220 from BASF Corporation. 8.00% by wt. of Enovate™ 3000 (HFC-245fa) from Honeywell. 3.00% by wt. of Toyocat® TRX from Tosoh Specialty Chemicals USA, Inc. 1.60% by wt. of water. The "B" side blend is sprayed with polyisocyanate obtained from Huntsman Corp. under the trade name Rubinate® M at a volume ratio of 1:1 through a high pressure spray machine known to those skilled in the art. The resulting foam has a density of 1.80 lb/cubic ft (28.8 kg/cubic meter) in a 2-inch (51 mm) pass with a compressive strength of 21.3 psig (248 kPa) in the parallel direction to rise and a closed cell content of 94.57%. The foam when sprayed at room temp (72° F./>20% RH) does not show any signs of creep, blow off or adhesion loss on the substrate.

Example 4

To show the improved solubility of HFC-245FA, a head space pressure test was used. From INVISTA S.à r. l., Terate® Polyol 2031, Terate® Polyol 4020, and Terate® Polyol 258 were compared against Terate® Polyol 6510 as used herein. Into a 32 ounce (946 ml) cup, 355 grams of APP is mixed with 48 grams of Enovate® 3000 (HFC-245fa) from Honeywell International Inc. This blend is poured into a pressure bottle and placed into an oven set at a temperature of between about 52 and 54° C. Pressure readings are taken at 30 minutes with a final reading taken at 5 hrs. The following Table 2 is illustrative of head space pressure test results.

TABLE 2

| Polyol | Time | Head Space Pressure |
|---|---|---|
| Terate ® 2031 | 30 min | 28 psig (294 kPa) |
|  | 5 hours | 45 psig (412 kPa) |
| Terate ® 4020 | 30 min | 10 psig (170 kPa) |
|  | 5 hours | 33 psig (329 kPa) |
| Terate ® 258 | 30 min | 7 psig (150 kPa) |
|  | 5 hours | 40 psig (377 kPa) |
| Terate ® 6510 | 30 min | 12 psig (184 kPa) |
|  | 5 hours | 23 psig (260 kPa) |

The Terate® Polyol 6510 head space pressure is lower than the other APPs indicating much higher solubility in HFC-245 FA. Benefits of higher solubility may include lower resin blend viscosity and lower foam density, lower blowing agent emissions, and lower drum head pressure during storage.

Example 5

Exemplar embodiments (A) to (E) of reaction products to form aromatic polyester polyols of the present disclosure are described in Table 3 below.

TABLE 3

| | Polyol Formulations | | |
|---|---|---|---|
| | Component | Wt % Charged | Theoretical OH Value |
| (A) | dimethyl terephalate (DMT) | about 35 | about 250 |
|  | Palmitic Acid | about 5 | |
|  | Castor Oil | about 15 | |
|  | Glycerine | about 5 | |
|  | diethylene glycol (DEG) | about 40 | |
| (B) | DMT | about 35 | about 235 |
|  | tall oil fatty acid (TOFA) | about 20 | |
|  | DEG | about 45 | |
| (C) | DMT | about 40 | about 254 |
|  | TOFA | about 15 | |
|  | Glycerine | about 5 | |
|  | DEG | about 40 | |
| (D) | DMT | about 40 | about 272 |
|  | DEG | about 45 | |
|  | Soybean Oil | about 15 | |
| (E) | Phthalic Anhydride | about 15 | Undetermined |
|  | DMT | about 25 | |
|  | DEG | about 40 | |
|  | TOFA | about 20 | |

The ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

The invention claimed is:

1. A spray foam composition, comprising a reaction product of an B side component comprising a resin blend composition with a A side component comprising a polyfunctional isocyanate, wherein the spray foam composition has an NCO index of about 120 to 250 at a volume ratio of A:B of about 1:1 to 3:1, wherein A is the A side component, and wherein B is the B side component, wherein the spray foam composition has a bio-based content of 7% by weight or greater as measured by ASTM 06866, wherein the resin blend composition comprises an aromatic polyol composition; a surfactant, a catalyst, and a blowing agent, wherein the aromatic polyol composition consists of the direct reaction product of: a mixture consisting essentially of di-ethyl glycol; one or more substances selected from an aromatic acid, an aromatic ester, and an aromatic anhydride; and 15 to 30% by weight of the aromatic polyol composition of tall oil fatty acid in combination with palmitic acid.

2. The spray foam composition of claim 1, wherein the spray foam composition has an NCO index of about 220 to 250.

3. The spray foam composition of claim 1, wherein the mixture consists essentially of di-ethyl glycol; dimethyl terephthalate; and 15 to 30% by weight of the aromatic polyol composition of tall oil fatty acid or tall oil fatty acid in combination with palmitic acid.

4. The spray foam composition of claim 3, wherein the mixture consists essentially of di-ethyl glycol; dimethyl terephthalate; and 15 to 30% by weight of the aromatic polyol composition of tall oil fatty acid.

5. The spray foam composition of claim 1, wherein the mixture consists essentially of di-ethyl glycol; phthalic anhydride and dimethyl terephthalate; and 15 to 30% by weight of the aromatic polyol composition of tall oil fatty acid.

6. The spray foam composition of claim 1, wherein the di-ethyl glycol is about 20 to 60% by weight of the aromatic polyol composition, wherein the one or more substances selected from an aromatic acid, an aromatic ester, and an aromatic anhydride is about 35 to 40% by weight of the aromatic polyol composition.

7. The spray foam composition of claim 1, wherein the surfactant is selected from the group consisting of: a silicone based surfactant, an organic based surfactant, and a mixture thereof.

8. The spray foam composition of claim 1, wherein the catalyst is selected from the group consisting of: metal-based, amine-based and mixtures thereof.

9. The spray foam composition of claim 1, wherein said tall oil fatty acid or tall oil fatty acid in combination with palmitic acid is about 20% to 30% by weight of the aromatic polyol composition.

10. The spray foam composition of claim 6, wherein tall oil fatty acid or tall oil fatty acid in combination with palmitic acid is about 20% to 30% by weight of the aromatic polyol composition.

* * * * *